United States Patent Office 3,019,111
Patented Jan. 30, 1962

3,019,111
MARMALADE BASE AND PROCESS FOR
ITS PREPARATION
Spencer A. Spross, Plant City, Fla., assignor to Salada-Shirriff-Horsey Ltd., Don Mills, Ontario, Canada
No Drawing. Filed Mar. 23, 1960, Ser. No. 16,941
21 Claims. (Cl. 99—129)

This invention relates to improvements in the production of marmalade and more particularly to an improved marmalade base for use in the preparation of the finished marmalade product which improved base will result in an enhanced finished marmalade.

In the usual procedure for the preparation of marmalade bases for use in the production of the finalized marmalade product the peel and pulp of the citrus fruits employed are first separated and the peel is cooked in water until tender and the pulp is normally heated to 212° F. and then filtered to clarify. The peel and pulp are then mixed together and placed in sealed jugs and then allowed to cool while in storage which is usually from 1 to 6 days after which the base is used to make up the finished marmalade product.

Citrus marmalade bases, especially those made from sweet oranges, prepared in the conventional manner lack stability as the natural pectin contained in the fruit is degraded to other forms, e.g. low methoxyl pectins, which have no value in the preparation of the finished marmalade product and which give rise to undesirable jellation of the base, particularly if the storage is longer than the six days. In addition, such degradation of the natural pectin results in off-flavours, again, particularly if the length of storage is increased.

Also for high quality marmalade it is desired that the proportion of fruit solid to pectin contained in the original fruit should be maintained in the marmalade base and such degradation of the pectin adversely affects this desired relationship.

Because of the adverse affects of storage of the conventional marmalade bases, such bases do not lend themselves to economical marmalade production since sufficient quantities of the base for year-round marmalade production cannot be made up during the citrus season, and for year-round marmalade production it is necessary to resort to the employment of expensive off-season varieties of citrus fruits from the various world supplies, or alternatively expensive cold storage stocks of the fruit must be resorted to.

Another approach to the problem has been to pack peel and single strength juice from the citrus fruits in separate containers, both sterilized and canned in hermitically sealed cans. Objections to this process are similar to the usual process in that the sterilized juice under normal storage conditions will deteriorate in both flavour and pectin quality so that again off-flavour results and the fruit solids and pectin content are not in the correct proportions for the manufacture of a high quality marmalade product.

It is the object of the present invention to overcome these prior art problems and to provide an improved stabilized base for the production of marmalade which base will contain and maintain the requisite proportion of fruit solid to pectin content even when stored over extended periods and, further, which base will not be subjected to the development of off-flavours even when stored over such extended periods, whereby sufficient quantities of the base can be produced during the citrus season for year round marmalade production providing important economical advantages and the resulting marmalade product produced with such base will be a high quality enhanced marmalade product.

Still another important object is to enable the production of an improved marmalade base as aforesaid which can be economically prepared in commercial quantities and which will lend itself to the ready and economical commercial production of the finished marmalade product.

Again it is an important object to provide an improved marmalade base as aforesaid which will lend itself to convenient storage.

According to the invention, the marmalade base is formed as two separate components, namely peel, as one component, and as the other component, stabilized clarified concentrated fruit solids from which the naturally occurring pectin has been removed and to which has been added an amount of citrus pectin equal in quantity to the quantity of the naturally occurring pectin previously removed.

Another important feature of the invention resides in treating the peel in a manner to render its pectin esterase content inactive to prevent its pectin and flavour degradation and to prevent loss of orange oil occurring in the peel.

Again, it is an important feature to form the stabilized fruit solids component as one having a low content of insoluble fruit solids whereby the component will have a low viscosity and excellent dispersion qualities to facilitate the addition of the citrus pectin to the product and to provide for a high density combined fruit solids-pectin component with enhanced storage and utilization properties in the preparation of the final marmalade product.

Still another important feature resides in treating the fruit solids component to deactivate all enzyme activity to prevent any deleterious affects therefrom.

Still another important feature resides in the concentration of the fruit solids-pectin component which concentration can be carried out to provide as desired a liquid marmalade base component, or a paste marmalade base component adaptable for freezing and frozen storage, or a dehydrated marmalade base component which can be stored without freezing.

These and other objects and features will become apparent from the following detailed description of the invention with reference to the examples hereinafter set out.

In preparing the marmalade base in accordance with the invention, the peel is removed from the citrus fruit and is then mechanically shredded. Immediately subsequent to the shredding, as it is delivered from the shredder, it is heated preferably to a temperature of 200° F. This heating inactivates the pectin esterase present in the peel which, if not inactivated, would instantly start a rapid process of pectin and flavour degradation.

Following heating, the inactivated peel is heated with water acidulated with citric acid having a pH of from 3.7 to 4 at a temperature of from 190° to 205° F. being careful not to boil the peel so that loss of orange oil in any orange peel present will be prevented.

When the peel has been heated sufficiently to render it tender, it is canned at a temperature of approxiately 200° to 205° and then cooled and stored preferably at a temperature of 40° F. or below until ready for use.

Peel prepared as aforesaid constitutes an independent or separate base component to be used in the preparation of the final marmalade product. The peeled citrus fruit is treated to form another independent or separate marmalade base product as follows:

The citrus juice and/or fruit solids which is extracted from the peeled citrus fruit by continuous extraction with water provides a soluble fruit solids having a density of from about 8° to 10° brix.

The extracted citrus fruit solids are immediately stabilized at substantially 205° F. and are then cooled to a temperature of from 100° F. to 150° F.

Following cooling, the fruit solids or extract which is in juice form is then depictinized with pectin-esterase at a temperature of from 100° F. to 140° F. after which the resulting depectinized juice is clarified by filtration or centrifuging in known manners or a combination of filtration and centrifuging may be used.

After clarification, the stabilized clarified depectinized juice is heated to totally deactivate all enzyme activity, such heating being carried out for one minute at 212° F. or a temperature-time equivalent.

The stabilized, depectinized clarified juice free from all enzyme activity is then concentrated and the process of its preparation is deviated at this point depending on whether the form of the marmalade base desired is a liquid marmalade base, a paste marmalade base or a dehydrated powdered marmalade base.

If a liquid marmalade base is desired, the juice is concentrated to a density of approximately 21° brix while for a paste consistency base, it is concentrated to a density of approximately 42° brix. If a powder base is to be formed, the juice is concentrated to a density of up to about 80° brix. It will be understood therefore that the actual degree of concentration will depend on the desired form which the base is to take for any specified marmalade formulation.

While it has been found necessary to remove the naturally occurring pectin from the fruit solids to prevent its degradation, it is necessary, for a quality final marmalade product, to provide in the ultimate marmalade the same proportion of pection to fruit solids as is present in the original fruit.

The stabilized, depectinized, clarified concentrate of fruit solids prepared in the manner aforesaid has a low viscosity and excellent dispersion qualities and has been found to be a particularly suitable medium into which pectin can be incorporated, and according to the invention, citrus pectin is added to this concentrate in an amount equal to the amount of the naturally occurring pectin removed in the depectinizing step. At the time of adding this citrus pectin, preferably a small amount of citric acid anhydrous and sodium bicarbonate are added to improve the product and facilitate storage.

Because of the fact that the concentrate offers an excellent medium into which large quantities of pectin can be dispersed, it is highly advantageous to incorporate the pectin in this medium rather than in any other spacing agent such as water, sugar syrup, glucose syrup, or the like which is or can be employed in the manufacture of the final marmalade product.

The citrus pectin is mechanically dispersed in the fruit solid concentrate by agitation and circulation through the use of mechanical stirrers, using for instance, one propeller on the bottom and another propeller in the top of the mixing tank.

For example, in the case of the liquid marmalade base component which has been concentrated to a density of approximately 21° brix, the concentrate, citrus pectin, citric acid anhydrous and sodium bicarbonate are added together in substantially the proportions by weight set out in Example 1.

*Example 1*

| Constituent: | Parts by weight |
| --- | --- |
| Concentrated stabilized depectinized clarified fruit solids or juice having a concentrated 21° brix | 450 |
| Citrus pectin powdered 150 grade | 30 |
| Citric acid anhydrous | 7 |
| Sodium bicarbonate | 3 |

In the case where the stabilized, depectinized, clarified juice has been concentrated to 42° brix the citrus pectin, citric acid anhydrous and sodium bicarbonate are combined substantially in the proportions by weight set out in Example 2.

*Example 2*

| Constituent: | Parts by weight |
| --- | --- |
| Concentrated stabilized depectinized clarified fruit solids having a concentrate of 42° brix | 450 |
| Citrus pectin 150 grade | 60 |
| Citric acid anhydrous | 7 |
| Sodium bicarbonate | 3 |

In the case of both Examples 1 and 2, the resulting pectin containing marmalade base product is frozen to 0° F. or below and it has been determined that storage at these temperatures will further stabilize the product so that it will keep indefinitely without degradation of the pectin or formation of any off or abnormal flavours.

In the case where it is desired to produce a dehydrated marmalade base product, the stabilized, depectinized, clarified juice is concentrated to substantially 80° brix after which it is dehydrated at a vacuum of 29 to 29.8 inches to a moisture content of approximately 1½% to 3%. This dehydrated product again requires the addition of citrus pectin to provide the requisite marmalade base and in the preparation of the base a mixture of citrus pectin 150 grade, citric acid anhydrous and sodium bicarbonate substantially in the proportions of 60 parts of pectin to 7 parts of citric acid and 3 parts of sodium bicarbonate is combined with the dehydrated fruit solid product as set forth in Example 3.

*Example 3*

| Constituent: | Parts by weight |
| --- | --- |
| Dehydrated fruit solid concentrate | 6 |
| Powdered citrus pectin and citric acid and sodium bicarbonate additive | 2 |

Following the combination of the dehydrated product and citrus pectin as set forth in Example 3, the resulting powder is placed in air-tight containers preferably containing a quantity of a bag of 16 mesh quick lime which is to absorb moisture and prevent caking. In this way, the resulting marmalade base powder can again be stored indefinitely without deterioration.

To produce the final marmalade product, the peel component prepared as above described and the marmalade bases of any one of the Examples 1 to 3 are combined with water, sugar and citric acid to form a marmalade of good colour, texture and flavour.

Illustrative examples of the preparation of the final marmalade product are given by the following example combinations.

*Example 4*

To produce 450 parts by weight of marmalade using the marmalade base of Example 1 there are combined the following constituents in substantially the following proportions by weight:

| Constituent: | Parts by weight |
|---|---|
| Marmalade base (Example 1) | 35 |
| Water | 73.6 |
| Citrus peel (prepared as above) | 60 |
| Citric acid anhydrous | 2.4 |
| Sugar | 279 |

*Example 5*

To produce 450 parts by weight of marmalade using the marmalade base of Example 2 there are combined the following constituents in substantially the following proportions by weight:

| Constituent: | Parts by weight |
|---|---|
| Marmalade base (Example 2) | 17.6 |
| Water | 91 |
| Citrus peel (prepared as above) | 60 |
| Citric acid anhydrous | 2.4 |
| Sugar | 279 |

*Example 6*

To produce 450 parts by weight of marmalade using the dry powder marmalade base of Example 3, there are combined the following constituents in substantially the following proportions by weight:

| Constituent: | Parts by weight |
|---|---|
| Marmalade base (Example 3) | 8 |
| Water | 100 |
| Citrus peel (prepared as above) | 60 |
| Citric acid anhydrous | 2.4 |
| Sugar | 279 |

It will be understood that the specific examples set out above are for illustrative purposes and it is not intended that the invention be limited thereto and variations and alterations in the specific quantities of the constituents involved and in the precise details of the preparation of the marmalade base in accordance with the invention as will appear to those skilled in the art may be made without departing from the spirit of the invention or scope of the appended claims.

What I claim is:

1. A marmalade base product comprising depectinized, clarified, heat stabilized concentrated predominantly soluble citrus fruit solids at least substantially free of added sugar and having citrus pectin dispersed therein.

2. A marmalade base product comprising depectinized, clarified, heat stabilized concentrated predominantly soluble citrus fruit solids at least substantially free of added sugar and having dispersed therein an amount of citrus pectin substantially equal to the amount of pectin removed from said fruit solids to depectinize same.

3. A marmalade base product as claimed in claim 2 in which said citrus pectin dispersed in said fruit solid concentrate comprises dry citrus pectin.

4. A marmalade base as claimed in claim 3 in which said citrus fruit solids concentrate and dry pectin powder are in frozen form.

5. A marmalade base as claimed in claim 3 in which said citrus fruit solids, in which said citrus pectin has been dispersed, are in dehydrated powder form.

6. A frozen marmalade base product comprising heat stabilized, clarified, predominantly soluble citrus fruit solids concentrate at least substantially free of added sugar and from which the naturally occurring pectin has been removed and having admixed therewith a quantity of citrus pectin substantially equivalent to the quantity of naturally occurring pectin removed.

7. A marmalade base product as claimed in claim 6 containing further small amounts of citric acid anhydrous and sodium bicarbonate.

8. A dehydrated marmalade base product comprising heat stabilized, clarified, dehydrated predominantly soluble citrus fruit solids at least substantially free of added sugar and from which the naturally occurring pectin has been removed and having admixed therewith a quantity of citrus pectin substantially equivalent to the quantity of naturally occurring pectin removed.

9. A dehydrated marmalade base product as claimed in claim 8 containing further small amounts of citric acid anhydrous and sodium bicarbonate.

10. Components for use in the manufacture of marmalade comprising peel having its naturally occurring pectin esterase inactivated and depectinized, clarified, heat stabilized, concentrated predominantly soluble fruit solids at least substantially free of added sugar and having citrus pectin dispersed therein.

11. Components as claimed in claim 10 in which the quantity of citrus pectin dispersed in said fruit solids is equivalent to the quantity of pectin removed in the depectinization of said fruit solids.

12. Base components for use in the manufacture of marmalade comprising peel having its naturally occurring pectin esterase inactivated and frozen, depectinized, clarified, heat stabilized, concentrated predominantly soluble fruit solids at least substantially free of any added sugar and having admixed therewith citrus pectin in an amount substantially equivalent to quantity of pectin removed from said fruit solids in the depectinization thereof.

13. Base components for use in the manufacture of marmalade comprising peel having its naturally occurring pectin esterase inactivated and depectinized, clarified, heat stabilized, dehydrated predominantly soluble fruit solids at least substantially free of added sugar and having admixed therewith citrus pectin in an amount substantially equivalent to quantity of pectin removed from said fruit solids in the depectinization thereof.

14. The process of preparing an improved marmalade base product comprising extracting citrus fruit solids and heat stabilizing same, then depectinizing such stabilized fruit solids, clarifying such depectinized fruit solids, then concentrating such stabilized, depectinized, and clarified fruit solids, then dispersing therein an amount of citrus pectin at least substantially free of any sugar addition substantially equivalent to the amount of pectin removed in the depectinizing step.

15. A process as claimed in claim 14 in which the stabilized depectinized and clarified fruit solids have the enzymes contained therein deactivated prior to concentration.

16. A process as claimed in claim 15 in which said stabilized, depectinized, clarified and deactivated fruit solids are concentrated to a density of substantially 21° brix prior to admixing the citrus pectin therewith.

17. A process as claimed in claim 14 in which said stabilized, depectinized, clarified and deactivated fruit solids are concentrated to a density of substantially 42° brix prior to admixing the citrus pectin therewith.

18. A process as claimed in claim 15 in which said stabilized, depectinized, clarified and deactivated fruit solids are concentrated to a density of substantially 80° brix and dehydrated to substantially 1½ to 3% moisture prior to admixing the citrus pectin therewith.

19. The process of preparing an improved marmalade base product comprising extracting fruit solids from citrus fruits to provide soluble fruit solids having a density of substantially from 8° to 10° brix and insoluble solids from substantially 2% to 5%, heat stabilizing such fruit solids by subjecting same to a temperature of substantially 205° F., then cooling same to substantially 100° F. to 150° F. and while at said latter temperature depectinizing same with pectin-esterase, then clarifying the stabilized, depectinized fruit solids, then heating same to the temperature-time equivalent of substantially 212° F. for one minute to deactivate all enzyme activity, then concentrating the stabilized, depectinized, clarified and deactivated fruit solids to a degree dependent on the desired consistency of the finished base product, then dispersing in the concentrated fruit solids a quantity of citrus pectin at least substantially free of any sugar addition and in an amount substantially equivalent to the amount of pectin removed in the depectinization step.

20. A process as claimed in claim 19 in which said stabilized, depectinized, clarified and deactivated fruit solids are concentrated to a liquid or paste consistency, and following addition of the citrus pectin, the fruit solids concentrate and citrus pectin are frozen to 0° F. for storage.

21. A process as claimed in claim 19 in which said stabilized, depectinized, clarified and deactivated fruit solids are concentrated and then dried to powder form to form a dehydrated powdered fruit solids product prior to the admixing therewith of the citrus pectin, and the dehydrated fruit solids and citrus pectin are then stored in air-tight containers.

References Cited in the file of this patent

UNITED STATES PATENTS

| | | |
|---|---|---|
| 1,844,666 | Leo | Feb. 9, 1932 |
| 1,999,443 | Cox | Apr. 30, 1935 |
| 2,407,801 | Steinwand | Sept. 17, 1946 |
| 2,459,431 | Johnson et al. | Jan. 18, 1949 |
| 2,596,662 | Ducker et al. | May 13, 1952 |

FOREIGN PATENTS

| | | |
|---|---|---|
| 470,753 | Great Britain | Aug. 16, 1937 |